United States Patent [19]

Wittren et al.

[11] Patent Number: 4,541,451
[45] Date of Patent: Sep. 17, 1985

[54] PRIORITY VALVE

[75] Inventors: Richard A. Wittren; James A. Miller, both of Cedar Falls, Iowa

[73] Assignee: Deere & Company, Moline, Ill.

[21] Appl. No.: 621,329

[22] Filed: Jun. 15, 1984

[51] Int. Cl.⁴ ............................................. G05D 11/00
[52] U.S. Cl. ..................................... 137/118; 137/101; 91/516
[58] Field of Search ................. 137/101, 118; 60/422; 91/514, 516, 532

[56] References Cited

U.S. PATENT DOCUMENTS

| | | | |
|---|---|---|---|
| 2,737,196 | 6/1952 | Eames | 137/101 |
| 2,846,850 | 8/1958 | Hall | 137/118 |
| 3,241,318 | 3/1966 | Rhode | 137/101 |
| 3,703,186 | 11/1972 | Brewer | 137/118 |
| 3,841,095 | 10/1974 | Baker | 60/422 |
| 3,937,243 | 2/1976 | Harkrader et al. | 137/118 |
| 3,979,908 | 9/1976 | Alderson | 60/422 |
| 4,192,337 | 3/1980 | Alderson et al. | 137/101 |
| 4,308,787 | 1/1982 | Parquet et al. | 91/516 |

OTHER PUBLICATIONS

U.S. application Ser. No. 524,806, now patent 4,470,260.
U.S. application Ser. No. 524,802 now U.S. Pat. No. 4,478,259.
U.S. application Ser. No. 522,920 now U.S. Pat. No. 4,463,557.
U.S. application Ser. No. 522,933 now U.S. Pat. No. 4,463,558.

Primary Examiner—Samuel Scott
Assistant Examiner—Noah Kamen

[57] ABSTRACT

A priority valve is disclosed for controlling fluid flow between a power source and a priority function and secondary function operated by the power source. The priority valve includes a housing having first and second bores formed therein. An inlet passage connects the power source to the first bore while first and second outlet passages connect the first bore to the primary and secondary functions respectively. A valve spool is positioned in the first bore and is movable between a first position permitting fluid flow from the inlet passage to the first outlet passage while blocking fluid flow to the second outlet passage and a second position permitting fluid flow from the inlet passage to the second outlet passage while blocking fluid flow to the first outlet passage. A pin is movably positioned in the second bore and has an enlarged end which extends into the first bore. a load signal passage connects the priority function to the second end of the first bore. When full fluid flow is demanded by the priority function the valve spool moves toward its first position. When the priority valve demands less than full flow, the spool valve moves toward its second position. If the priority function demands pressure approaching a maximum pressure value which can be delivered by the power source the enlarged end of the pin contacts the valve spool and forces it toward its second position.

11 Claims, 2 Drawing Figures

PRIORITY VALVE

FIELD OF THE INVENTION

This invention relates to a priority valve for controlling fluid flow between a power source and functions operated by the power source, one of the functions being a priority function and at least one other function being a secondary function.

BACKGROUND OF THE INVENTION

In many agricultural and industrial off-road equipment, a priority valve is used in a power-on-demand system to assure that a priority function, such as steering, always has available fluid. In such systems, should the wheel encounter a curb or rut wherein the priority function demands a greater pressure than the pump can supply, it is usual that the priority function will stall. When this happens, the pressure differential across the priority valve becomes zero causing the priority valve to shut off flow to secondary or non-priority functions. The current practice for remedying this problem is to provide a pilot line relief valve and an orifice pilot flow for the spring chamber. The relief valve is set above the maximum pressure requirement for the priority function but below maximum pump pressure. However the relief valve and orifice pilot flow does suffer disadvantages in that there is added noise, added power loss at stall, and in case of some steering applications, continued slow steering wheel rotation during stall or when in a locked position.

Now a priority valve has been invented which eliminates the need for the orifice pilot and relief valve.

SUMMARY OF THE INVENTION

Briefly, this invention relates to a priority valve for controlling fluid flow between a power source and a primary and secondary function. The priority valve includes a housing having first and second bores formed therein. An inlet passage connects the power source to the first bore and first and second outlet passages connect the first bore to the priority and secondary functions, respectively. A valve spool is positioned in the first bore and is movable between first and second ends of the first bore. The valve spool has an annular groove which is in constant communication with the inlet passage and with at least one of the outlet passages. A passageway is formed within the valve spool which constantly connects the first end of the first bore to the first outlet passage. The valve spool is movable between a first position permitting fluid flow from the inlet passage to the first outlet passage and a second position permitting fluid flow from the inlet passage to the second outlet passage. A pin is movably positioned in the second bore and has an enlarged end which extends into the first bore. First and second springs are present which urge the spool valve toward the first position and the pin toward the spool valve. The priority valve further includes a load signal passage connecting the priority function to the second end of the first bore. With an increase in pressure in the load signal passage, the spool valve is urged toward the first position while a decrease in pressure in the load signal passage allows the spool valve to move toward the second position under the influence of pressure in the first end of the first bore. The enlarged end of the pin is also capable of contacting and forcing the spool valve toward the second position when the priority function demands pressure approaching maximum pressure value which can be delivered by the power source.

The general object of this invention is to provide a priority valve for a hydraulic system. A more specific object of this invention is to provide a priority valve for controlling fluid flow from a power source to a priority and/or a secondary hydraulic function.

Another object of this invention is to provide a simple and reliable priority valve.

Still another object of this invention is to provide a priority valve for a hydraulic system which reduces noise within the system and eliminates service problems associated with relief valve durability, adjustment and orifice plugging.

A further object of this invention is to provide a priority valve which remains in a position which allows fluid flow to non-priority functions even though the pressure differential across the priority valve may be zero due to stalling of the priority function.

Other objects and advantages of the present invention will become more apparent to those skilled in the art in view of the following description and the accompanying drawings.

DETAILED DESCRIPTION OF THE PREFERRED EMBODIMENTS

Figure 1:
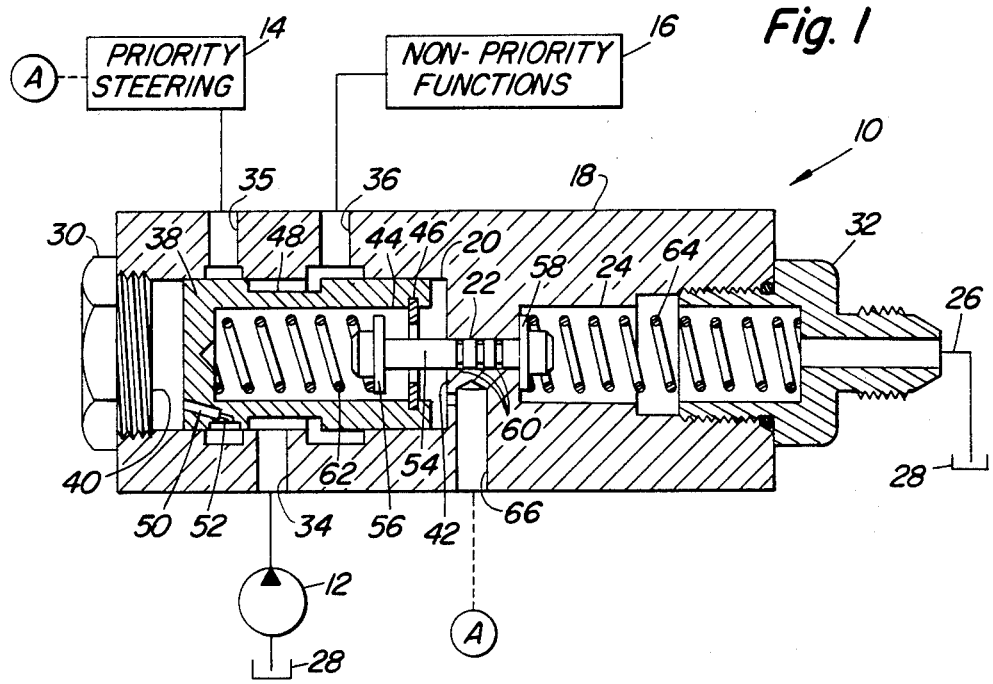
FIG. 1 is a sectional view of a priority valve with the remainder of the hydraulic circuit shown schematically.

Referring to FIG. 1, a priority valve 10 is shown in a hydraulic circuit wherein a power source 12, such as a fixed or variable displacement pump, supplies pressurized fluid directly through the priority valve 10 to one or more primary functions 14, only one of which is shown, and to at least one secondary or non-priority function 16. In most agricultural and industrial off-road type equipment, the steering apparatus is normally one of the priority functions and it will be referred to hereinafter as the priority function 14. The secondary functions 16 can include hydraulic cylinders which operate hitches, auxiliary motors, etc.

The priority valve 10 includes a housing 18 having first and second bores 20 and 22 formed therein. In addition, a spring cavity 24 is coaxially aligned with the second bore 22 and communicates via a drain passage 26 with a reservoir 28. For purposes of assembly, the housing 18 is shown with a pair of plugs 30 and 32 which close off one end of the first bore 20 and the spring cavity 24, respectively.

The first bore 20 is connected to the power source 12 by an inlet passage 34, to the priority function 14 by a first outlet passage 35 and to the secondary function 16 by a second outlet passage 36. Positioned within the first bore 20 is a valve spool 38 which is movable between first and second ends 40 and 42, respectively, of the first bore 20. The valve spool 38 includes an internal bore 44 formed adjacent to the second end 42, a snap ring 46 retained on the internal bore 44 and an annular groove 48 formed on its outer circumference. The annular groove is in constant communication with the inlet passage 34 and with at least one of the outlet passages 35 and 36. The valve spool 38 further includes a flow passage 50 which connects the first end 40 to the first outlet passage 35. This permits the pressurized fluid in the first passage 35 to impinge on the adjacent surface of the valve spool 38 and force the valve spool 38 rightward toward a second position. The passage 50 can have a restriction 52 formed across it so as to meter flow into or out of the first end 40. The valve spool 38 is movable between a first position permitting fluid flow from the inlet passage 34 to the first outlet passage 35, while blocking fluid flow to the second outlet passage 36, and a second position permitting fluid flow between the first passage 34 and the second outlet passage 36, while blocking fluid flow to the first outlet passage 35.

A pin 54 is movably positioned in the second bore 22 and has first and second enlarged ends 56 and 58, respectively, which extend into the first bore 20 and into the spring cavity 24. The enlarged ends 56 and 58 limit the movement of the pin 54 within the second bore 22. Enlarged end 58 need not be an internal part of pin 54. Preferably, the outside diameter of the pin 54, disregarding the first and second enlarged ends 56 and 58, is approximately equal to the inner diameter of the second bore 22 so as to prevent fluid flow therethrough. However, it is anticipated that some leakage will occur along the length of the pin 54 into the spring cavity 24 and that this fluid will eventually find its way through the passage 26 to the reservoir 28. In this regard, the pin 54 can contain one or more annular grooves 60 which enable the pressure of any fluid trapped therein to be distributed evenly about its circumference thereby minimizing leakage of fluid along its length and reducing frictional forces on the pin 54.

The priority valve 10 also includes a first spring 62 positioned in the first bore 20 between the valve spool 38 and the enlarged first end 56 of the pin 54. A second spring 64, having a higher preload than the first spring 62, is positioned in the spring cavity 24 and abuts the second enlarged end 58 of the pin 54. With the second spring 64 having the higher preload, one can be assured that the pin 54 will be urged leftwards within the first bore 20 when there is no pressurized fluid in the first end 40 of the bore 20. It should also be noted that the first enlarged end 56 of the pin 54 is sized so as to enter the internal bore 44 of the valve spool 38 and to abut against the snap ring 46 and force the valve spool 38 rightwards. This happens when the pressure within the second end 42, in combination with the force of the first spring 62, sufficiently exceeds the force of the second spring 64.

Lastly, the priority valve 10 includes a load signal passage 66 which connects the priority function 14 to the second end 42 of the first bore 20. The pressure in the load signal passage 62 is typically lower than or equal to the pressure in the inlet passage 34. This is because the structure of the priority function 14 creates an orifice which can cause a pressure drop between the pump 12 and the load signal passage 62. An example of a priority function having a load signal line for connection to passage 62 is given in U.S. Pat. No. 4,463,558 which shows a hydraulic steering system with the load signal line indicated by number 46. When there is no flow demand to the priority function 14, the pressure in load signal passage 62 drops to zero. When full fluid flow is demanded by the priority function 14, the pressure difference across the priority function 14 will remain relatively low and, due to little restriction across the priority function 14, the valve spool 38 will remain in its first position. In this position, the opening between the inlet passage 34 and the first outlet passage 35 is enlarged while the passage leading to the secondary function 16 can be blocked thereby assuring that the priority function 14 has full fluid flow. When the priority function 14 demands less than full fluid flow from the power source 12, the pressure difference across the priority function 14 increases thereby permitting the valve spool 38 to move rightwards. Such movement allows fluid flow from the inlet passage 34 to both of the outlet passages 35 ad 36. As the valve spool 38 continues to move rightwards, the opening to the second outlet passage 36 increases while the opening to the first outlet passage 35 decreases.

Should a situation occur wherein at least one of the steering wheels of the vehicle encounters a rut or comes in contact with a curb or other stationary object, the priority function 14 could demand a pressure approaching or exceeding the maximum pressure value which could be delivered by the power source 12. In this situation, the pressure in the load signal passage 66 would increase above a predetermined value and the force of this pressure on the first end 56 of the pin 54, together with the force of the first spring 62, would overcome the force of the second spring 64 and force the pin 54 rightwards. The pin 54 would then abut against the snap ring 46 and force the valve spool 38 to the right. This action assures that there will be an open passage between the power source 12 and the secondary function 16 should the priority function 14 stall. If a situation occurs where the priority function 14 is not stalled but the load signal pressure in the passage 66 is quite high, then a condition could exist where the pin 54 is moved rightward but not to the extent that the enlarged end 56 contacts the snap ring 46.

One skilled in the art will quickly realize that the spring rates of the first and second springs 62 and 64 can be varied, as well as the length of the pin 54, the length of the first bore 20 and the length of the valve spool 38. By sizing these components, one will be able to specify at what pressure the first enlarged end 56 of the pin 54 will contact the snap ring 46 and force the valve spool 38 rightwards. The components can be sized such that the pin 54 will cause the valve spool 38 to move rightwards at a pressure value above the maximum pressure requirement of the priority function 14 but below the maximum pump pressure of the power source 12. In this fashion, the pin 54 will replace the functions of the conventional relief valve and pilot orifice.

Figure 2:
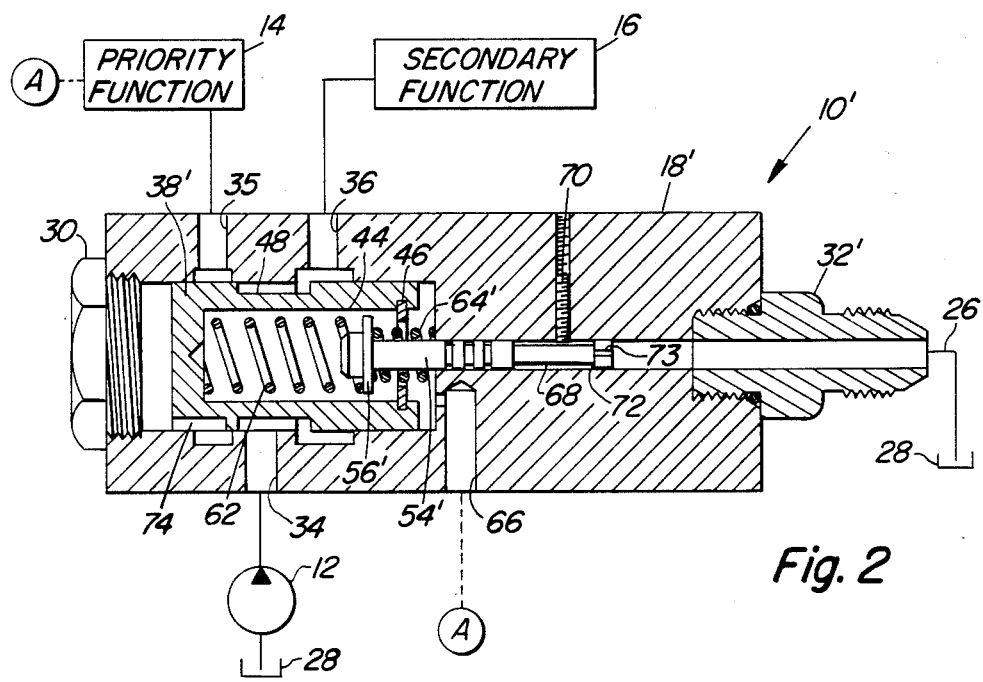
FIG. 2 is a sectional view of an alternative embodiment of the priority valve with the hydraulic circuit shown schematically.

Referring to FIG. 2, an identical hydraulic circuit is shown having a priority valve 10' which depicts an alternative embodiment. For matter of convenience, similar elements in FIG. 2 are denoted by the same numerals as those used in FIG. 1. The priority valve 10' includes a housing 18' which differs in that it does not contain a spring cavity 24. Instead, a second spring 64' is positioned between a first end 56' of a pin 54' and the right surface of the first bore 20. In addition, the pin 54' is elongated and contains an annular groove 68 formed about its outer circumference approximate its right end. A set screw 70 is retained in the housing 18' which aligns with the annular groove 68. The annular groove 68 is sized such that upon leftward movement of the pin 54', a right surface 72 of the annular groove 68 will abut and contact the set screw 70 and prevent further leftward movement of the pin 54'. In short, the annular groove 68 and the set screw 70 serve as a stop and perform the same function as the second enlarged end 58 of the pin 50, as is shown in FIG. 1. The pin 54' could also have a groove 73 formed in its right end to permit fluid trapped in the annular groove 68 to be drained to the reservoir 28. Furthermore, a smaller size plug 32' is used to seal off the second bore 22'. Also, the flow passage 50 has been replaced by a passage 74 which is formed on the outer circumference of a valve spool 38'. Aside from these few differences, the operation of the priority valve 10' is identical to that of the priority valve 10.

While the invention has been described in conjunction with two specific embodiments, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

We claim:

1. A priority valve for controlling fluid flow between a power source and functions operated by said power source, one of said functions being a priority function and at least one other function being a secondary function, said valve comprising:
   (a) a housing having first and second bores formed therein;
   (b) an inlet passage connecting said power source to said first bore and first and second outlet passages connecting said first bore to said priority and secondary functions, respectively;
   (c) a valve spool positioned in said first bore so as to divide said first bore into first and second ends, said valve spool having an annular groove which is in constant communication with said inlet passage and with at least one of said outlet passages, and a passageway formed therein having a first opening which is in constant communication with said first end of said first bore and a second opening which is in constant communication with said first outlet passage, said valve spool being movable between a first position wherein said annular groove is in communication with said first outlet passage while said valve spool blocks fluid flow to said second outlet passage from communication with said annular groove, and a second position wherein said annular groove is in communication with said second outlet passage, while said valve spool blocks said first outlet passage from communication with said annular groove;
   (d) a pin movably positioned in said second bore having an enlarged end which extends into said second end of said first bore;
   (e) biasing means for urging said valve spool toward said first position and said pin toward said valve spool;
   (f) means carried by said valve spool for engagement with said pin after limited movement of said pin relative to and in a direction away from said valve spool; and
   (g) a load signal passage establishing fluid communication between said priority function and said second end of said first bore, which fluid acts to urge said valve spool toward said first position and said pin out of said first bore such that a decrease in pressure difference between said load signal passage and said inlet passage urges said valve spool toward said first position, an increase in pressure difference between said load signal passage and said inlet passage allows said valve spool to move toward said second position, and a predetermined maximum fluid pressure within said load signal passage causes said pin to move out of said first bore engaging and moving said spool toward said second position.

2. The priority valve of claim 1 wherein said biasing means includes first and second springs, said first spring being positioned between said valve spool and said pin.

3. The priority valve of claim 2 wherein said second spring has a higher preload than said first spring.

4. The priority valve of claim 2 wherein an internal bore is formed in said valve spool adjacent to said second end of said first bore and both said first spring and said enlarged end of said pin are positioned within said internal bore.

5. The priority valve of claim 4 wherein said means for engagement of said pin comprises a snap ring retained on the inner periphery of said internal bore and situated between said enlarged end of said pin and said second bore having an inner diameter less than the outer diameter of said enlarged pin end such that said enlarged pin end contacts said snap ring forcing said valve spool toward said second position when the pressure in said load signal passage exceeds a predetermined value, and the force caused by this pressure acting on said pin together with the force of said first spring exceeds the force of said second spring.

6. The priority valve of claim 1 wherein said pin has at least one annular groove formed about its circumference which enables the pressure of any trapped fluid therein to be distributed about its circumference thereby minimizing leakage of fluid along the length thereof and reducing frictional forces on said pin.

7. The priority valve of claim 6 wherein said pin has a plurality of spaced apart annular grooves formed about its circumference.

8. The priority valve of claim 1 wherein a stop is present to limit movement of said pin into said first bore.

9. A priority valve for controlling fluid flow between a power source and hydraulic functions operated by said power source, one of said hydraulic functions being a priority function and at least one other function being a secondary function, said valve comprising:
   (a) a housing having first and second bores formed therein;
   (b) an inlet passage connecting said power source to said first bore and first and second outlet passages connecting said first bore to said priority and secondary functions, respectively;
   (c) a valve spool positioned in said first bore so as to divide said first bore into first and second ends, said valve spool having an annular groove which is in constant communication with said inlet passage and with at least one of said outlet passages, and a passageway formed therein having a first opening which is in constant communication with said first end of said first bore and a second opening which is in constant communication with said first outlet passage, said valve spool being movable between a first position wherein said annular groove is in communication with said first outlet passage, while simultaneously sealing said second outlet passage from communication with said annular groove, and a second position wherein said annular groove is in communication with said second outlet passage, while simultaneously sealing said first outlet passage from communication with said annular groove;

(d) a pin movably positioned in said second bore having an enlarged end which extends into said second end of said first bore;
(e) first and second springs positioned in said first bore for urging said valve spool toward said first position and said pin toward said valve spool;
(f) means for engaging said pin with said spool valve after limited free movement of said pin out of said first bore; and
(g) a load signal passage establishing fluid communication between said priority function and said second end of said first bore which fluid acts to urge said valve spool toward said first position and said pin out of said bore such that a decrease in pressure difference between said load signal passage and said inlet passage urges said valve spool toward said first position, an increase in pressure difference between said load signal passage and said inlet passage allows said valve spool to move toward said second position, and a predetermined maximum fluid pressure within said load signal passage causes said pin to move out of said first bore engaging and moving said spool toward said second position.

10. The priority valve of claim 9 wherein said passageway has a restriction formed thereacross for limiting fluid flow therethrough.

11. A priority valve for controlling fluid flow between a power source and hydraulic functions operated by said power source, one of said hydraulic functions being a priority function and at least one other function being a secondary function, said priority valve comprising:
(a) a housing having first and second bores formed therein and a spring cavity communicating with said second bore which is connected to a fluid reservoir;
(b) an inlet passage connecting said power source to said first bore and first and second outlet passages connecting said first bore to said priority and secondary functions, respectively;
(c) a valve spool positioned in said first bore so as to divide said first bore into first and second ends, said valve spool having an internal bore formed therein adjacent to said second end of said first bore, a stop connected to the inner periphery of said internal bore, an annular groove which is in constant communication with said inlet passage and with at least one of said outlet passages, and a passageway formed therein having a first opening which is in constant communication with said first end of said first bore and a second opening which is in constant communication with said first outlet passage, said valve spool being movable between a first position wherein said annular groove is in communication with said first outlet passage, while simultaneously sealing said second outlet passage from communication with said annular groove, and a second position wherein said annular groove is in communication with said second outlet passage, while simultaneously sealing said first outlet passage from communication with said annular groove;
(d) a pin movably positioned in said second bore having first and second enlarged ends, said first enlarged end extending into said internal bore formed in said valve spool beyond said stop and said second enlarged end extending into said spring cavity, said enlarged ends limiting the movement of said pin with said first enlarged end being sized to engage said stop after movement of said pin for a predetermined distance out of said internal bore;
(e) a first spring positioned in said first bore between said valve spool and said first enlarged end of said pin for urging said valve spool toward said first position;
(f) a second spring positioned in said spring cavity which contacts said second enlarged end of said pin for urging said pin into said first bore; and
(g) a load signal passage establishing fluid communication between said priority function and said second end of said first bore which fluid acts to urge said valve spool toward said first position and said pin out of said bore such that a decrease in pressure difference between said load signal passage and said inlet passage urges said valve spool to move toward said first position, an increase in pressure difference between said load signal passage and said inlet passage allows said valve spool to move toward said second position, and a predetermined maximum fluid pressure within said load signal passage causes said first enlarged end of said pin to contact said stop and force said valve spool toward said second position.

* * * * *